(12) United States Patent
Yu et al.

(10) Patent No.: US 11,826,729 B2
(45) Date of Patent: Nov. 28, 2023

(54) PHOTOCATALYST AND APPLICATION THEREOF IN ENVIRONMENTALLY FRIENDLY PHOTOCATALYTIC TREATMENT OF POWER BATTERY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Ting Peng, Guangdong (CN); Yinghao Xie, Guangdong (CN); Xuemei Zhang, Guangdong (CN)

(73) Assignees: Guangdong Brunp Recycling Technology Co., Ltd., Guangdong (CN); Hunan Brunp Recycling Technology Co., Ltd., Hunan (CN); Hunan Brunp EV Recycling Co., Ltc., Hunan (CN)

( * ) Notice: Subject to any disclaimer, the term of this patent is extended or adjusted under 35 U.S.C. 154(b) by 8 days.

(21) Appl. No.: 18/003,314

(22) PCT Filed: Apr. 30, 2021

(86) PCT No.: PCT/CN2021/091554
§ 371 (c)(1),
(2) Date: Dec. 24, 2022

(87) PCT Pub. No.: WO2021/258856
PCT Pub. Date: Dec. 30, 2021

(65) Prior Publication Data
US 2023/0191371 A1 Jun. 22, 2023

(30) Foreign Application Priority Data
Jun. 24, 2020 (CN) .......................... 202010589960.1

(51) Int. Cl.
*B01J 23/50* (2006.01)
*H01M 10/54* (2006.01)
(Continued)

(52) U.S. Cl.
CPC ............... *B01J 23/50* (2013.01); *B01J 21/08* (2013.01); *B01J 27/24* (2013.01); *B01J 35/004* (2013.01);
(Continued)

(58) Field of Classification Search
CPC . B01J 23/50; B01J 23/682; B01J 21/08; B01J 27/24; B01J 35/004; B01J 35/023;
(Continued)

(56) References Cited

U.S. PATENT DOCUMENTS

| 5,632,863 A * | 5/1997 | Meador ................... C10B 53/00 201/3 |
| 2016/0043449 A1* | 2/2016 | Belcher ................. H01M 10/54 438/82 |

FOREIGN PATENT DOCUMENTS

| CN | 103990488 A | 8/2014 |
| CN | 106794459 A | 5/2017 |

(Continued)

OTHER PUBLICATIONS

Jungang Hou et al., "Three-dimensional Z-scheme AgCl/Ag/γ-TaON heterostructural hollow spheres for enhanced visible-light photocatalytic performance." Applied Catalysis B: Environmental 142-143, pp. 579-589. (Year: 2013).*

(Continued)

*Primary Examiner* — Patricia L. Hailey
(74) *Attorney, Agent, or Firm* — Buchalter; Jason W. Croft

(57) ABSTRACT

Disclosed are a photocatalyst and application thereof in environmentally friendly photocatalytic treatment of a power battery. The photocatalyst is obtained by loading Ag—TaON on a hollow glass microsphere, wherein a mass ratio of the Ag—TaON to the hollow glass microsphere is 1:5 to 10. According to the invention, the Ag—TaON and the (Continued)

US 11,826,729 B2

Page 2 hollow glass microsphere are compounded, the hollow glass microsphere has better light permeability, which avoids mutual shielding between catalysts, such that the photocatalyst filled in a reactor is fully excited, which is capable of effectively improving a light utilization rate, thus improving the catalytic conversion efficiency of the photocatalyst.

9 Claims, 2 Drawing Sheets

(51) Int. Cl.
| | |
|---|---|
| B01J 21/08 | (2006.01) |
| B01J 35/00 | (2006.01) |
| B01J 35/08 | (2006.01) |
| B01J 35/02 | (2006.01) |
| B01J 37/00 | (2006.01) |
| B01J 37/04 | (2006.01) |
| B01J 37/34 | (2006.01) |
| B01J 37/02 | (2006.01) |
| B01J 37/08 | (2006.01) |
| B01J 37/14 | (2006.01) |
| B01J 27/24 | (2006.01) |

(52) U.S. Cl.
CPC .............. *B01J 35/023* (2013.01); *B01J 35/08* (2013.01); *B01J 37/0036* (2013.01); *B01J 37/024* (2013.01); *B01J 37/0221* (2013.01); *B01J 37/0228* (2013.01); *B01J 37/04* (2013.01); *B01J 37/08* (2013.01); *B01J 37/14* (2013.01); *B01J 37/341* (2013.01); *H01M 10/54* (2013.01)

(58) Field of Classification Search
CPC .... B01J 35/08; B01J 37/0036; B01J 37/0221; B01J 37/024; B01J 37/04; B01J 37/08; B01J 37/14; B01J 37/341; H01M 10/54; Y02W 30/84

USPC .............................. 502/200, 347, 353; 501/33
See application file for complete search history.

(56) References Cited

FOREIGN PATENT DOCUMENTS

| | | |
|---|---|---|
| CN | 108940249 A | 12/2018 |
| CN | 108941162 A | 12/2018 |
| CN | 111804323 A | 10/2020 |
| JP | 2016203031 A | 12/2016 |
| WO | WO-2015151775 A1 * 10/2015 | .............. B01J 23/31 |
| WO | WO-2022235721 A1 * 11/2022 | |

OTHER PUBLICATIONS

Shijie Li et al., "Synthesis of n-type TaON microspheres decorated by p-type Ag2O with enhanced visible light photocatalytic activity." Molecular Catalysis 435, pp. 135-143. (Year: 2017).*
S. Rtimi et al., "Coupling of narrow and wide band-gap semiconductors on uniform films active in bacterial disinfection under low intensity visible light: Implications of the interfacial transfer (IFCT)." Journal of Hazardous Materials 260, pp. 860-868. (Year: 2013).*
J. H. Hseih et al., "Effects of Ag contents on antibacterial behaviors of TaON—Ag nanocomposite thin films." Surface & Coatings Technology 205, pp. 5337-5340. (Year: 2010).*
Office Action in Chinese Application 2020105899601 dated Oct. 8, 2021.
Hsieh, et al. "Photocatalytic and antibacterial properties of TaON—Ag nanocomposite thin films, Thin Solid Films" vol. 518, Issue 24, Oct. 1, 2010, pp. 7263-7266, <https://doi.org/10.1016/j.tsf.2010.04.109>.
International Search Report and Written Opinion in PCT/CN2021/091554 dated Jul. 27, 2021.

* cited by examiner

PHOTOCATALYST AND APPLICATION THEREOF IN ENVIRONMENTALLY FRIENDLY PHOTOCATALYTIC TREATMENT OF POWER BATTERY

CROSS-REFERENCE TO RELATED APPLICATION

This application is a national stage filing under 35 U.S.C. § 371 of international application number PCT/CN2021/091554, filed Apr. 30, 2021, which claims priority to Chinese patent application No. 202010589960.1, filed Jun. 24, 2020. The contents of these applications are incorporated herein by reference in their entirety.

TECHNICAL FIELD

The present invention relates to the field of catalysts, and more particularly, to a photocatalyst and application thereof in an environmentally friendly photocatalytic treatment of a power battery.

BACKGROUND

The electrolyte of a lithium battery is a carrier of ion transport in the battery. The electrolyte generally consists of lithium and an organic solvent. The electrolyte plays a role of conducting ions between a cathode and an anode of the lithium battery. The electrolyte is prepared from high-purity organic solvent, electrolyte lithium, and necessary additives in a certain proportion under certain conditions.

The electrolyte of the lithium battery is a liquid in which electrolytes are dissolved in the organic solvent. The electrolytes are usually lithium perchlorate, lithium hexafluorophosphate, and the like. The organic solvent usually refers to carbonate liquid organic matters. The electrolyte is an organic volatile liquid and has obvious corrosivity, which will cause serious damage to the respiratory tract if it is inhaled for a long term. Lithium ion batteries should be collected and properly treated during recycling, and the volatilization and dissipation of the electrolyte should be strictly controlled to avoid harm to human health and the ecological environment.

The traditional method of treating the electrolyte is to put the lithium ion battery in a pyrolysis oven so that the electrolyte and other organic matters are pyrolyzed at the same time. However, the traditional recovery methods, such as "Anaerobic Cracking Recovery and Sorting Process of Lithium Battery" (CN201810712762.2), cannot treat the electrolyte alone, and the diaphragm is also removed by pyrolysis during pyrolysis, which leads to the ineffective recovery of the diaphragm, low resource recovery rate and obvious limitations. There are still some problems such as low catalytic conversion efficiency, high catalyst cost, and low degradation rate when using the current catalyst to catalytically degrade the electrolyte.

SUMMARY

The objective of the present invention is to provide a photocatalyst and application thereof in the environmentally friendly photocatalytic treatment of a power battery. According to the power battery photocatalyst of the present invention, TaON and the hollow glass microsphere are compounded, the hollow glass microsphere has better light permeability, which avoids mutual shielding between catalysts, such that the photocatalyst filled in a reactor is fully excited, which is capable of effectively improving a light utilization rate, thereby improving the catalytic conversion efficiency of the photocatalyst.

To implement the foregoing objective, the present invention employs the following technical solutions.

A photocatalyst is obtained by loading Ag—TaON on a hollow glass microsphere; and a mass ratio of the Ag—TaON to the hollow glass microsphere is 1: (5 to 10).

Preferably, the hollow glass microsphere has a particle size ranging from 10 μm to 10 mm.

Preferably, chemical compositions of the hollow glass microsphere by mass are as follows: 45% to 90% of $SiO_2$, 5% to 50% of $Al_2O_3$, 4% to 10% of $K_2O$, 1% to 10% of CaO, and 0% to 12% of $B_2O_3$.

A preparation method of a photocatalyst includes steps of:
(1) grinding TaON into powder, dispersing the powder in a solvent, adding a soluble silver salt, stirring, irradiating, centrifuging, and washing to obtain a Ag—TaON catalyst; and
(2) dispersing the Ag—TaON catalyst in a sodium tripolyphosphate solution, adding a hollow glass microsphere, stirring, drying, and sintering to obtain the photocatalyst with Ag—TaON loaded on surfaces of the hollow glass microsphere.

Preferably, in step (1), the solvent is water and methanol; and a mass ratio of the TaON to the water to the methanol is 1:20 to 60:15 to 40.

Preferably, in step (1), the soluble silver salt is a $AgNO_3$ solution.

More preferably, the $AgNO_3$ solution has a concentration of 0.5 mol·$L^{-1}$ to 1 mol·$L^{-1}$.

Preferably, in step (1), the irradiating is carried out by a high-pressure mercury lamp in a nitrogen atmosphere and lasts for 10 minutes to 30 minutes.

Preferably, in step (2), the sodium tripolyphosphate solution has a concentration of 0.1 mol·$L^{-1}$ to 1 mol·$L^{-1}$.

Preferably, in step (2), the stirring is carried out at a speed of revolution ranging from 400 r/min to 800 r/min and lasts for 20 minutes to 60 minutes.

Preferably, in step (2), the sintering is carried out at a temperature of 200° C. to 300° C. in a nitrogen atmosphere and lasts for 1 hour to 2 hours.

Preferably, the TaON is prepared by the following steps:
(1) pretreating a tantalum foil;
(2) cooling, introducing an inert gas, then introducing reaction gas A, raising a temperature, keeping the temperature and reacting to obtain $Ta_2O_5$; and
(3) cooling, introducing an inert gas, then introducing reaction gas B, raising the temperature, keeping the temperature and reacting to obtain TaON, wherein, in step (2), the reaction gas A is a mixed gas of $O_2$ and $N_2$; and in step (3), the reaction gas B is a mixed gas of $NH_3$ and $N_2$.

Preferably, the pretreating of step (1) includes: pushing a corundum porcelain boat containing the tantalum foil into a middle heating section of a tube furnace, sealing with a flange, and introducing an inert gas at a flow rate of 2 mL·$min^{-1}$ to 30 mL·$min^{-1}$ for 20 minutes to 120 minutes at ambient temperature; and then, switching to another gas channel to introduce a pretreatment gas at a flow rate of 2 mL·$min^{-1}$ to 30 mL·$min^{-1}$, then raising the temperature to 250° C. to 350° C. at a rate of 2° C. $min^{-1}$ to 8° C. $min^{-1}$, and keeping the temperature for 30 minutes to 150 minutes.

More preferably, the pretreatment gas is a mixed gas of $H_2$ and $N_2$, and the $H_2$ has a concentration of 5% to 10%.

Preferably, in step (2) and step (3), the cooling is reducing the temperature to ambient temperature.

Preferably, in step (2) and step (3), the inert gas is at least one selected from the group consisting of pure $N_2$, Ar, and He.

Preferably, in step (2) and step (3), the introducing the inert gas is carried out at a flow rate of 2 mL·min$^{-1}$ to 30 mL·min$^{-1}$, and lasts for 20 minutes to 120 minutes.

Preferably, the $O_2$ has a concentration of 5% to 10%.

Preferably, in step (2), the introducing the reaction gas A is carried out at a flow rate of 2 mL·min$^{-1}$ to 30 mL·min$^{-1}$.

Preferably, in step (2), the temperature is raised to 500° C. to 600° C. at a rate of 2° C.·min$^{-1}$ to 8° C.·min$^{-1}$.

Preferably, in step (2), the temperature is kept for 30 minutes to 150 minutes.

Preferably, the $NH_3$ has a concentration of 5% to 10%.

Preferably, in step (3), the introducing the reaction gas A is carried out at a flow rate of 2 mL·min$^{-1}$ to 30 mL·min$^{-1}$.

Preferably, in step (3), the temperature is raised to 800° C. to 900° C. at a rate of 2° C.·min$^{-1}$ to 8° C.·min$^{-1}$.

Preferably, in step (3), the temperature is kept for 180 minutes to 300 minutes.

An environmentally friendly photocatalytic treatment method of a power battery includes steps of:
(1) disassembling and pyrolyzing a waste lithium battery to obtain a gas mixed with an electrolyte; and
(2) introducing the gas mixed with the electrolyte into a cleaning liquid, then introducing the gas mixed with the electrolyte into a reactor filled with the photocatalyst, and irradiating with a light source for photocatalysis to degrade the electrolyte into $CO_2$ and $H_2O$.

Preferably, in step (2), the cleaning liquid is at least one selected from the group consisting of NaOH, Ca(OH)$_2$, and KOH.

Preferably, in step (2), the cleaning liquid has a concentration of 0.1 mol·L$^{-1}$ to 1 mol·L$^{-1}$.

Preferably, in step (2), the light source is ultraviolet light.

The reactor filled with the photocatalyst is installed on a roof of a factory building for daylighting, and the solar energy excites the photocatalyst to generate photogenerated electric charges, thus carrying out catalytic oxidation and cracking polyethylene and polypropylene into micromolecules.

Preferably, in step (2), the reactor has a loading rate of 30% to 100%.

Beneficial Effects

1. According to the present invention, the Ag—TaON and the hollow glass microsphere are compounded, the hollow glass microsphere has better light permeability, which avoids mutual shielding between catalysts, such that the photocatalyst filled in the reactor is fully excited, which is capable of effectively improving a light utilization rate, thus improving the catalytic conversion efficiency of the photocatalyst.
2. Compared with the traditional chemical reduction method, the catalyst of the present invention is combined with Ag in a light deposition mode, which can obtain smaller Ag granules, so that the dispersion degree of Ag is larger, the atomic utilization rate is improved, the consumption of Ag is reduced, and the catalyst cost is lower.
3. According to the present invention, Ag—TaON is employed as the photocatalyst, and a light response range of TaON can cover part of visible light, the introduction of Ag can enrich electrons, and the Ag—TaON catalyst can carry out photocatalytic reaction under the action of the visible light.
4. According to the present invention, Ag—TaON is employed as the photocatalyst, and the photocatalysis technology is employed to degrade the electrolyte. After removing fluoride from the electrolyte by alkali liquor, the electrolyte is introduced into a photocatalytic reactor, and the organic matters in the electrolyte are catalytically oxidized into $CO_2$ and $H_2O$ directly under the action of photocatalysis. The treatment process needs no additional chemicals, and the treatment process is environment-friendly, safe and low-cost. The treated tail gas is nontoxic and harmless, and can be directly discharged.

DETAILED DESCRIPTION

Figure 1:
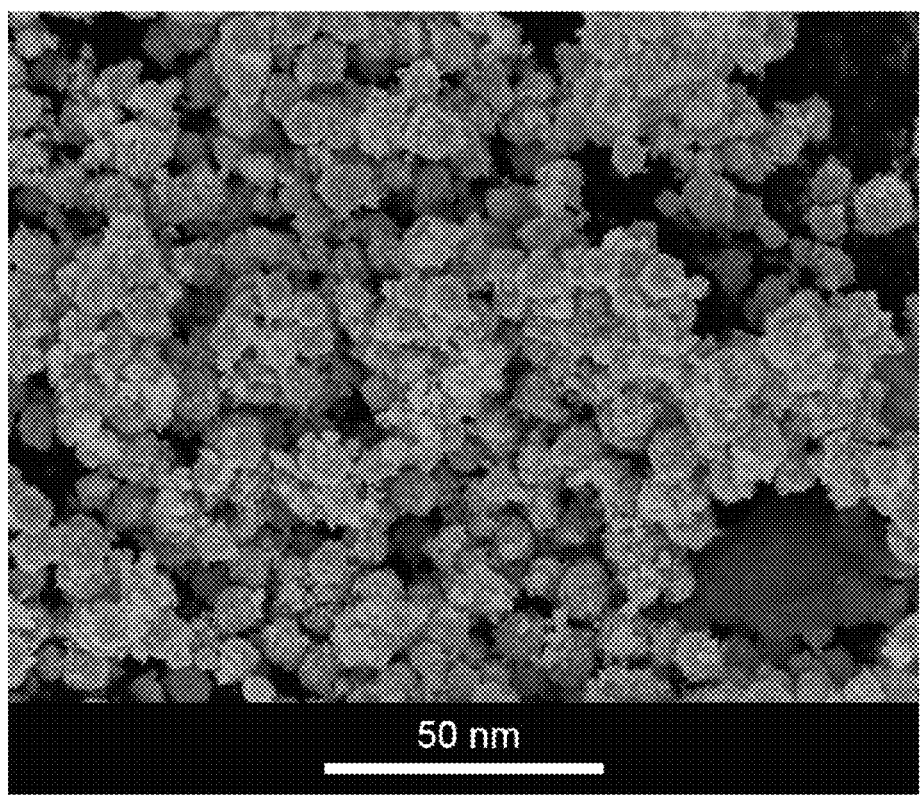
FIG. 1 is an SEM graph of Ag—TaON powder in Embodiment 2 of the present invention.
Figure 2:
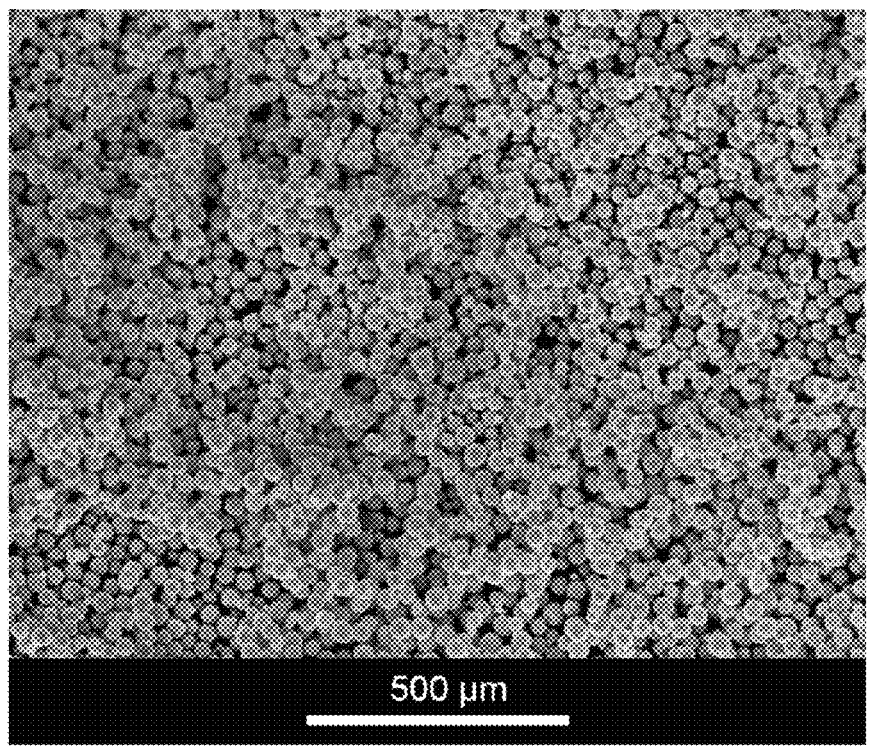
FIG. 2 is an SEM graph of a photocatalyst prepared in Embodiment 2 of the present invention.
Figure 3:
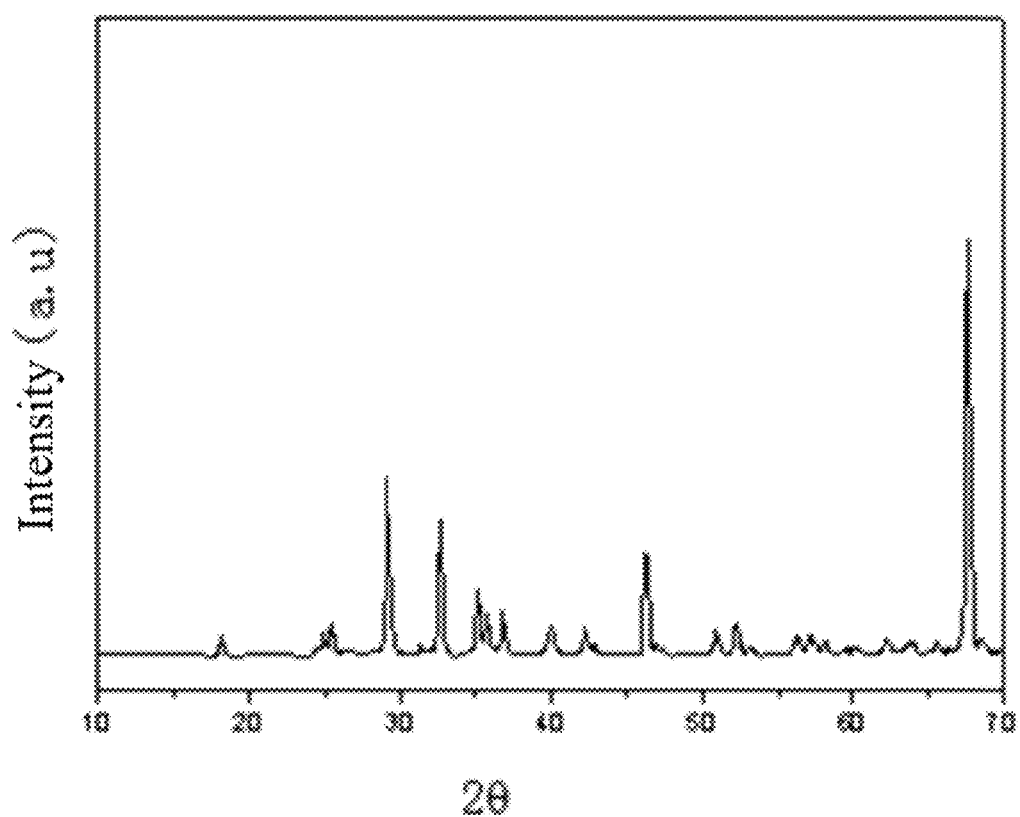
FIG. 3 is an XRD graph of the Ag—TaON powder in Embodiment 2 of the present invention.

In order to make the technical solutions of the present invention clearer to those skilled in the art, the following embodiments are listed for explanation. It should be noted that the following embodiments do not limit the scope of protection claimed by the present invention.

Unless otherwise specified, the raw materials, reagents or devices used in the following embodiments can be obtained from conventional commercial sources or by existing known methods.

Embodiment 1

A photocatalyst was obtained by loading Ag—TaON on a hollow glass microsphere; and a mass ratio of the Ag—TaON to the hollow glass microsphere was 1:5.

A preparation method of a power battery photocatalyst includes steps of:
(1) pushing a corundum porcelain boat containing a tantalum foil into a middle heating section of a tube furnace, sealing with a flange, introducing pure $N_2$ at a flow rate of 2 mL·min$^{-1}$ for 20 minutes at ambient temperature, switching to another gas channel to introduce a mixed gas of $H_2$ and $N_2$ at a flow rate of 2 mL·min$^{-1}$, the $H_2$ having a concentration of 5%, and meanwhile, starting a temperature control program to raise the temperature to 250° C. at a rate of 2° C.·min$^{-1}$, and keeping the temperature for 30 minutes;
(2) reducing the temperature to ambient temperature, switching to another gas channel to introduce pure $N_2$ at a flow rate of 2 mL·min$^{-1}$ for 20 minutes, then switching to another gas channel to introduce a mixed gas of $O_2$ and $N_2$ at a flow rate of 2 mL·min$^{-1}$, the $O_2$ having a concentration of 5%, and meanwhile, starting the temperature control program to raise the temperature to 500° C. at a rate of 2° C.·min$^{-1}$, and keeping the temperature for 30 minutes to obtain $Ta_2O_5$;
(3) reducing the temperature to ambient temperature, switching to another gas channel to introduce pure $N_2$ at a flow rate of 2 mL·min$_{-1}$ for 20 minutes, then switching to another gas channel to introduce a mixed gas of $NH_3$ and $N_2$ at a flow rate of 2 mL·min$^{-1}$, the $NH_3$ having a concentration of 5%, and meanwhile, starting the temperature control program to raise the temperature to 800° C. at a rate of 2° C.·min$^{-1}$, and keeping the temperature for 180 minutes to obtain TaON;

(4) reducing the temperature to ambient temperature, taking the TaON out, grinding the TaON into powder, adding magnetons according to a proportion of 1 g: 20 mL: 15 mL (TaON: water: methanol) to form a disperse system under vigorously magnetic stirring (a speed of revolution of 800 r/min), placing the disperse system in nitrogen atmosphere, then adding a $AgNO_3$ solution with a concentration of 0.5 $mol \cdot L^{-1}$ according to the load of 0.5%, and then stirring for 5 minutes, irradiating the mixture with a high-pressure mercury lamp for 10 minutes, centrifuging and washing the mixture to obtain a Ag—TaON catalyst; and (5) dispersing the Ag—TaON catalyst in a sodium tripolyphosphate solution with a concentration of 0.1 $mol \cdot L^{-1}$, adding 200 mesh hollow glass microsphere according to a weight ratio of 1:5 (Ag—TaON: hollow glass microsphere), stirring the mixture (a speed of revolution of 400 r/min) for 20 minutes, drying the mixture, and then sintering the same at 200° C. for 1 hour under nitrogen atmosphere to obtain the photocatalyst loaded on the surfaces of the hollow glass microsphere.

An environmentally friendly photocatalytic treatment method of a power battery includes steps of:

(1) disassembling and pyrolyzing a waste lithium battery to obtain a gas mixed with an electrolyte; and (2) introducing the gas mixed with the electrolyte into a NaOH solution with a concentration of 0.1 $mol \cdot L^{-1}$, then introducing the gas mixed with the electrolyte into a reactor filled with the photocatalyst, and irradiating with an ultraviolet lamp for photocatalysis to degrade the electrolyte to obtain $CO_2$ and $H_2O$.

Embodiment 2

A photocatalyst was obtained by loading Ag—TaON on a hollow glass microsphere; and a mass ratio of the Ag—TaON to the hollow glass microsphere was 1:8.

A preparation method of a photocatalyst includes steps of:

(1) pushing a corundum porcelain boat containing a tantalum foil into a middle heating section of a tube furnace, sealing with a flange, introducing pure Ar at a flow rate of 15 $mL \cdot min^{-1}$ for 70 minutes at ambient temperature, switching to another gas channel to introduce a mixed gas of $H_2$ and $N_2$ at a flow rate of 15 $mL \cdot min^{-1}$, the $H_2$ having a concentration of 8%, and meanwhile, starting a temperature control program to raise the temperature to 300° C. at a rate of 5° $C. \cdot min^{-1}$, and keeping the temperature for 90 minutes;

(2) reducing the temperature to ambient temperature, switching to another gas channel to introduce pure Ar at a flow rate of 15 $mL \cdot min^{-1}$ within 70 minutes, then switching to another gas channel to introduce a mixed gas of $O_2$ and $N_2$ at a flow rate of 15 $mL \cdot min^{-1}$, the $O_2$ having a concentration of 8%, and meanwhile, starting the temperature control program to raise the temperature to 550° C. at a rate of 5° $C. \cdot min^{-1}$, and keeping the temperature for 90 minutes to obtain $Ta_2O_5$;

(3) reducing the temperature to ambient temperature, switching to another gas channel to introduce pure Ar at a flow rate of 15 $mL \cdot min^{-1}$ within 70 minutes, then switching to another gas channel to introduce a mixed gas of $NH_3$ and $N_2$ at a flow rate of 15 $mL \cdot min^{-1}$, the $NH_3$ having a concentration of 8%, and meanwhile, starting the temperature control program to raise the temperature to 850° C. at a rate of 5° $C. \cdot min^{-1}$, and keeping the temperature for 240 minutes to obtain TaON;

(4) reducing the temperature to ambient temperature, taking the TaON out, grinding the TaON into powder, adding magnetons according to a proportion of 1 g: 40 mL: 25 mL (TaON: water: methanol) to form a disperse system under vigorously magnetic stirring (a speed of revolution of 1,200 r/min), placing the disperse system in nitrogen atmosphere, then adding $AgNO_3$ solution with a concentration of 0.8 $mol \cdot L^{-1}$ according to the load of 0.7%, and then stirring for 5 minutes, irradiating the mixture with a high-pressure mercury lamp for 20 minutes, centrifuging and washing the mixture to obtain a Ag—TaON catalyst; and (5) dispersing the Ag—TaON catalyst in a sodium tripolyphosphate solution with a concentration of 0.5 $mol \cdot L^{-1}$, adding 300 mesh hollow glass microsphere according to a weight ratio of 1:8 (Ag—TaON: hollow glass microsphere), stirring the mixture (a speed of revolution of 600 r/min) for 40 minutes, drying the mixture, and then sintering the same at 250° C. for 1.5 hours under nitrogen atmosphere to obtain the power battery photocatalyst loaded on the hollow glass microsphere.

An environmentally friendly photocatalytic treatment method of a power battery includes steps of:

(1) disassembling and pyrolyzing a waste lithium battery to obtain a gas mixed with an electrolyte; and (2) introducing the gas mixed with the electrolyte into a NaOH solution with a concentration of 0.2 $mol \cdot L^{-1}$, then introducing the gas mixed with the electrolyte into a reactor filled with the photocatalyst, and irradiating with an ultraviolet lamp for photocatalysis to degrade the electrolyte to obtain $CO_2$ and $H_2O$.

Embodiment 3

A photocatalyst was obtained by loading Ag—TaON on a hollow glass microsphere; and a mass ratio of the Ag—TaON to the hollow glass microsphere was 1:8.

A preparation method of a photocatalyst includes steps of:

(1) pushing a corundum porcelain boat containing a tantalum foil into a middle heating section of a tube furnace, sealing with a flange, introducing pure Ar at a flow rate of 15 mL·min−1 for 70 minutes at ambient temperature, switching to another gas channel to introduce a mixed gas of H2 and N2 at a flow rate of 15 mL·min−1, the H2 having a concentration of 8%, and meanwhile, starting a temperature control program to raise the temperature to 300° C. at a rate of 5° C.·min−1, and keeping the temperature for 90 minutes;

(2) reducing the temperature to ambient temperature, switching to another gas channel to introduce pure Ar at a flow rate of 15 mL·min−1 within 70 minutes, then switching to another gas channel to introduce a mixed gas of O2 and N2 at a flow rate of 15 mL·min−1, the O2 having a concentration of 8%, and meanwhile, starting the temperature control program to raise the temperature to 550° C. at a rate of 5° C.·min−1, and keeping the temperature for 90 minutes to obtain Ta2O5;

(3) reducing the temperature to ambient temperature, switching to another gas channel to introduce pure Ar at a flow rate of 15 mL·min−1 within 70 minutes, then switching to another gas channel to introduce a mixed gas of NH3 and N2 at a flow rate of 15 mL·min−1, the NH3 having a concentration of 8%, and meanwhile, starting the temperature control program to raise the temperature to 850° C. at a rate of 5° C.·min−1, and keeping the temperature for 240 minutes to obtain TaON;

(4) reducing the temperature to ambient temperature, taking the TaON out, grinding the TaON into powder, adding magnetons according to a proportion of 1 g: 40 mL (TaON: water: methanol) to form a disperse system under vigorously magnetic stirring (a speed of revolution of 1,200 r/min), placing the disperse system in nitrogen atmosphere, then adding AgNO3 solution with a concentration of 0.8 mol·L−1 according to the load of 0.7%, and then stirring for 5 minutes, irradiating the mixture with a high-pressure mercury lamp for 20 minutes, centrifuging and washing the mixture to obtain a Ag—TaON catalyst; and (5) dispersing the Ag—TaON catalyst in a sodium tripolyphosphate solution with a concentration 0.5 mol·L−1, adding 300 mesh hollow glass microsphere according to a weight ratio of 1:8 (Ag—TaON : hollow glass microsphere), stirring the mixture (a speed of revolution of 600 r/min) for 40 minutes, drying the mixture, and then sintering the same at 250° C. for 1.5 hours under nitrogen atmosphere to obtain the power battery photocatalyst loaded on the surfaces of the hollow glass microsphere.

An environmentally friendly photocatalytic treatment method of a power battery includes steps of:

(1) disassembling and pyrolyzing a waste lithium battery to obtain a gas mixed with an electrolyte; and (2) introducing the gas mixed with the electrolyte into a NaOH solution with a concentration of 0.2 mol·L−1, then introducing the gas mixed with the electrolyte into a reactor filled with the photocatalyst, and irradiating with an ultraviolet lamp for photocatalysis to degrade the electrolyte to obtain CO2 and H2O.

Comparative Example 1

A method for catalyzing an electrolyte of a TaON catalyst includes steps of:

(1) placing $Ta_2O_5$ in a tube furnace, keeping the temperature at 800° C. for 4 hours in an ammonia atmosphere to obtain TaON, and grinding the TaON into powder to obtain a TaON catalyst; and (2) adding the TaON and a hollow glass microsphere into a sodium tripolyphosphate solution, stirring, dispersing and drying the mixture, and sintering the mixture at 200° C., and using the obtained catalyst for photocatalytic degradation of the electrolyte in a quartz reactor.

Comparative Example 2

A method for catalyzing an electrolyte of a Ag—TaON catalyst includes steps of:

(1) placing $Ta_2O_5$ in a tube furnace, keeping the temperature at 800° C. for 4 hours in an ammonia atmosphere to obtain TaON, grinding the TaON into powder, adding the power into a silver nitrate solution with a load of 0.7%, and reducing with sodium borohydride to obtain Ag—TaON ; and (2) adding the Ag—TaON and a hollow glass microsphere into a sodium tripolyphosphate solution, stirring, dispersing and drying the mixture, and sintering the mixture at 200° C., and using the obtained catalyst for photocatalytic degradation of the electrolyte in a quartz reactor.

Comparison of Degradation Effects:

The products obtained by carrying out photodegradation of electrolyte according to Embodiment 2 and Comparative Examples 1 and 2 were detected by gas chromatography respectively. The yield results are shown in FIG. 1. It can be seen from Table 1 that the catalyst in Comparative Example 1 has no Ag, and the electrolyte conversion rate is 73.2%, while the electrolyte conversion rate in Embodiment 2 is 96.2%. The electrolyte conversion rate in Embodiment 2 is higher than that in Comparative Example 1, indicating that the catalytic property of Embodiment 2 is higher than that of the catalyst in Comparative Example 1. After 300 cycle tests, the electrolyte conversion rate in Comparative Example 1 remains at 62.3%, while the electrolyte conversion rate in Embodiment 2 is indicating that the stability of the catalyst in Embodiment 2 is better than that in Comparative Example 1. This fully reflects the effect of Ag in improving the catalytic efficiency. The Ag—TaON catalyst is obtained by reducing the catalyst in Comparative Example 2 with sodium borohydride and the Ag—TaON catalyst is obtained by photodeposition in Embodiment 2. Although the contents of the catalyst Ag in Comparative Example 2 and Embodiment 2 are the same, the conversion rate of Comparative Example 2 is only 85.3% with the same amount of Ag, and after 300 cycle tests, the conversion rate is only 67.7%, so the property of Comparative Example 2 is far lower than that of Embodiment 2. In this way, it is indicated that the property of the catalyst obtained by the reduction method of the present invention is superior to that of the traditional method.

TABLE 1

Comparison of photodegradation properties of electrolytes in Example 2 with that of Comparative Examples 1 and 2

|  | Degradation rate | Cycle property (conversion rate after 300 cycles) |
| --- | --- | --- |
| Comparative Example 1 | 73.2% | 62.3% |
| Comparative Example 2 | 85.3% | 67.7% |
| Embodiment 2 | 96.2% | 95.6% |

The photocatalyst and the application thereof in the environmentally friendly photocatalytic treatment of the power battery provided by the present invention have been introduced in detail above, and the principle and implementation of the present invention have been illustrated with specific embodiments. The explanation of the above embodiments is only used to help understand the method and the core idea of the present invention, including the best mode, and also enables any person skilled in the art to practice the present invention, including manufacturing and using any device or system, and implementing any combined method. It should be pointed out that for those of ordinary skills in the art, several improvements and modifications can be made to the present invention without departing from the principle of the present invention, and these improvements and modifications also fall within the protection scope of the claims of the present invention. The protection scope of the present invention is defined by the claims, and may include other embodiments that can be thought of by those skilled in the art. If these other embodiments have structural elements that are not different from the literal expression of the claims, or if they include equivalent structural elements that are not materially different from the literal expression of the claims, these other embodiments should also be included in the scope of the claims.

The invention claimed is:

1. A photocatalyst, wherein the photocatalyst is obtained by loading Ag—TaON on a hollow glass microsphere; and a mass ratio of the Ag—TaON to the hollow glass microsphere is 1: (5 to 10);

wherein the photocatalyst is prepared by the following steps of:
  (1) grinding TaON into powder, dispersing the powder in a solvent, adding a soluble silver salt, stirring, irradiating, centrifuging and washing to obtain a Ag—TaON catalyst; and
  (2) dispersing the Ag—TaON catalyst in a sodium tripolyphosphate solution, adding the hollow glass microsphere, stirring and sintering to obtain the photocatalyst with Ag—TaON loaded on the hollow glass microsphere.

2. The photocatalyst of claim 1, wherein the hollow glass microsphere has a particle size ranging from 10 μm to 10 mm.

3. The photocatalyst of claim 1, wherein in step (1), the solvent is water and methanol; a mass ratio of the TaON to the water to the methanol is 1: (20 to 60): (15 to 40); and the soluble silver salt is a $AgNO_3$ solution.

4. The photocatalyst of claim 1, wherein in step (2), the sintering is carried out at a temperature of 200° C. to 300° C. in a nitrogen atmosphere, and lasts for 1 hour to 2 hours.

5. The photocatalyst of claim 1, wherein the TaON is prepared by the following steps:
  (1) pretreating a tantalum foil;
  (2) cooling, introducing an inert gas, then introducing reaction gas A, raising a temperature, keeping the temperature and reacting to obtain $Ta_2O_5$; and
  (3) cooling, introducing an inert gas, then introducing reaction gas B, raising the temperature, keeping the temperature and reacting to obtain TaON, wherein in step (2), the reaction gas A is a mixed gas of $O_2$ and $N_2$; and the reaction gas B in step (3) is a mixed gas of $NH_3$ and $N_2$.

6. The photocatalyst of claim 5, wherein the pretreating of step (1) comprises pushing a corundum porcelain boat containing the tantalum foil into a middle heating section of a tube furnace, sealing with a flange, and introducing an inert gas at a flow rate of 2 mL·min$^{-1}$ to 30 mL·min$^{-1}$ for 20 minutes to 120 minutes at ambient temperature; and then, switching to another gas channel to introduce a pretreatment gas at a flow rate of 2 mL·min$^{-1}$ to 30 mL·min$^{-1}$, then raising the temperature to 250° C. to 350° C. at a rate of 2° C.·min$^{-1}$ to 8° C.·min$^{-1}$, and keeping the temperature for 30 minutes to 150 minutes, wherein the pretreatment gas is a mixed gas of $H_2$ and $N_2$.

7. The photocatalyst of claim 5, wherein in step (2) and step (3), the inert gas is at least one selected from the group consisting of pure $N_2$, Ar, and He.

8. An environmentally friendly photocatalytic treatment method of a power battery, comprising:
  (1) disassembling and pyrolyzing a waste lithium battery to obtain a gas mixed with an electrolyte; and
  (2) introducing the gas mixed with the electrolyte into a cleaning liquid, then introducing the gas mixed with the electrolyte into a reactor filled with the photocatalyst according to claim 1, and irradiating with a light source for photocatalysis to degrade the electrolyte into $CO_2$ and $H_2O$.

9. The environmentally friendly photocatalytic treatment method of the power battery of claim 8, wherein the cleaning liquid is at least one selected from the group consisting of NaOH, $Ca(OH)_2$, and KOH.

* * * * *

UNITED STATES PATENT AND TRADEMARK OFFICE
CERTIFICATE OF CORRECTION

| | | |
|---|---|---|
| PATENT NO. | : 11,826,729 B2 | Page 1 of 1 |
| APPLICATION NO. | : 18/003314 | |
| DATED | : November 28, 2023 | |
| INVENTOR(S) | : Haijun Yu et al. | |

It is certified that error appears in the above-identified patent and that said Letters Patent is hereby corrected as shown below:

On the Title Page

[73] Assignees:
Delete the Assignee "Hunan Brunp EV Recycling Co., Ltc., Hunan (CN)" and insert --Hunan Brunp EV Recycling Co., Ltd., Hunan (CN)--

Signed and Sealed this
Nineteenth Day of November, 2024

Katherine Kelly Vidal
*Director of the United States Patent and Trademark Office*